United States Patent [19]

Robertson et al.

[11] Patent Number: 4,838,911
[45] Date of Patent: Jun. 13, 1989

[54] VIDEO TAPE STORAGE CABINET

[76] Inventors: William M. Robertson, 209 Northwood, Lewisville, Tex. 75067; Edward J. Burke, 1700 Hearthstone, Plano, Tex. 75087; Randy L. Clark, 1730 N. Jupiter Rd., #2119, Garland, Tex. 75042

[21] Appl. No.: 237,695

[22] Filed: Aug. 26, 1988

Related U.S. Application Data

[63] Continuation of Ser. No. 77,392, Jul. 24, 1987, abandoned.

[51] Int. Cl.[4] ............................................. F25B 21/02
[52] U.S. Cl. ........................................ 62/3.3; 62/93; 62/521
[58] Field of Search .................... 62/3, 93, 521, 520

[56] References Cited

U.S. PATENT DOCUMENTS

| | | | |
|---|---|---|---|
| 2,110,635 | 3/1938 | Rosebrook et al. | 62/521 X |
| 3,036,383 | 5/1962 | Edwards | 62/93 X |
| 3,172,269 | 3/1965 | Cole | 62/3 |
| 3,194,023 | 7/1965 | Sudmeier | 62/3 |
| 3,195,315 | 7/1965 | Boehmer et al. | 62/3 |
| 3,264,756 | 8/1966 | Fuentevilla | 62/520 X |
| 3,733,836 | 5/1973 | Corini | 62/3 |
| 3,857,254 | 12/1974 | Lobel | 62/93 X |
| 4,297,850 | 11/1981 | Reed | 62/3 |
| 4,586,342 | 5/1986 | Morishita et al. | 62/3 |
| 4,644,753 | 2/1987 | Burke | 62/3 |
| 4,685,303 | 8/1987 | Branc et al. | 62/3 |

FOREIGN PATENT DOCUMENTS

| | | | |
|---|---|---|---|
| 1150693 | 6/1963 | Fed. Rep. of Germany | 62/3 |
| 1187284 | 2/1965 | Fed. Rep. of Germany | 62/3 |

Primary Examiner—William E. Tapolcai

[57] ABSTRACT

A videotape storage cabinet is disclosed which includes a housing having a base portion supporting a videotape cooling compartment, a heat sink compartment, and a top, the top for supporting the videotape user equipment. A temperature controlled thermoelectric heat pump is mounted between the compartments with a cold sink and a heat sink extending into the cooling and heating compartments, respectively. The cold sink provides videotape bins designed to support videotapes individually for cooling by the cold sink. A drawer is provided in the cooling compartment for a drying agent. The drying agent may be in either packaged form or bulk form for placement in the drawer. The drying agent is to control the moisture content of the cold air in the cooling compartment. The controlled temperature thermoelectric heat pump is set to maintain the cooling compartment to 65–70 degrees Fahrenheit, and the drying agent sufficient to maintain the relative humidity between 35–45 percent for preservation of the videotapes during storage. The drying agent can be replaced by a small dehumidifying thermoelectric heat pump mounted in the cooling compartment, and a drain provided to remove the moisture.

3 Claims, 3 Drawing Sheets

VIDEO TAPE STORAGE CABINET

This application is a continuation of application Ser. No. 077,392, filed 7/24/87, now abandoned.

This invention relates to cabinets and more particularly to a videotape storage cabinet. As used in this specification and claims the word "videotape" includes any high density media such as videotapes, cassettes, films or the like having components which are temperature sensitive and hygroscopic and absorb or lose moisture.

BACKGROUND OF THE INVENTION

Successful long-term storage of videotape recordings has been determined to be possible with this invention. Videotape recorders are sophisticated, precision machines. A video recording is made with a magnetic head which is narrow (about as narrow as a human hair), and travels a mile a minute over a thin film of flexible polyester.

The tape is made up of components which are hygroscopic and absorb or lose moisture, depending upon the humidity and temperature. It has been established that tape handling on a videotape recorder is dependent on humidity and temperature. The ideal relative humidity for videotapes is between about 35-45 percent. Within this range a good tape and recorder will operate optimally. One-hundred percent relative humidity can never be tolerated. Any condensation of moisture on the tape surface will cause the tape to cling to the tape guiding surface. This is because the water destroys the air film between the tape and the guides; as a result, tape movement will stop and the tape damaged.

Temperatures above approximately 150 degrees Fahrenheit can cause permanent damage to the tape. For long term preservation, the ideal tape temperature is between about 65-70 degrees Fahrenheit.

Thus, tapes should never be kept in a hot, wet environment; long enough for moisture to accumulate on the tapes. Most commonly used video tapes use a polyester-urethane binder which deteriorates in a hot, wet environment through hydrolysis. The rate of deterioration depends on the type of binder system used, but if the binder is allowed to deteriorate to the point at which all of the ester molecules are consumed, the tape is permanently degraded.

SUMMARY OF THE INVENTION

Accordingly it is an object of this invention to provide a storage cabinet which provides a cool, dry, dust free, dark storage area for videotapes.

Another object of the invention is to provide a cabinet that will prevent the sun from shining directly on the tapes.

Yet another object of the invention is to provide a cabinet of ergonomics design.

Still another object of the invention is to provide a cabinet having a combined temperature and humidity controller.

Briefly stated the videotape storage cabinet constituting the subject matter of the invention includes a cabinet having an insulated cooling compartment to which a temperature controlled thermoelectric heat pump is attached for maintaining the insulated cabinet compartment at a preselected temperature. Either a drying agent is provided in a cooling compartment drawer or a thermoelectric heat pump of suitable size is provided in the cooling compartment for absorbing moisture from the air in the cooling compartment. Thus, the invention provides an automatically cooled desiccator for video cassette tapes or films or both. The cabinet is or ergonomic design as it can be fabricated using a wood, metal or plastic and is of a size sufficient for supporting a video cassette recorder or portable television.

BRIEF DESCRIPTION OF THE DRAWINGS

Other objects and features of the invention will become more readily understood from the following detailed description when read in conjunction with the accompanying drawings, in which.

DETAILED DESCRIPTION OF THE PREFERRED EMBODIMENT

Figure 1:
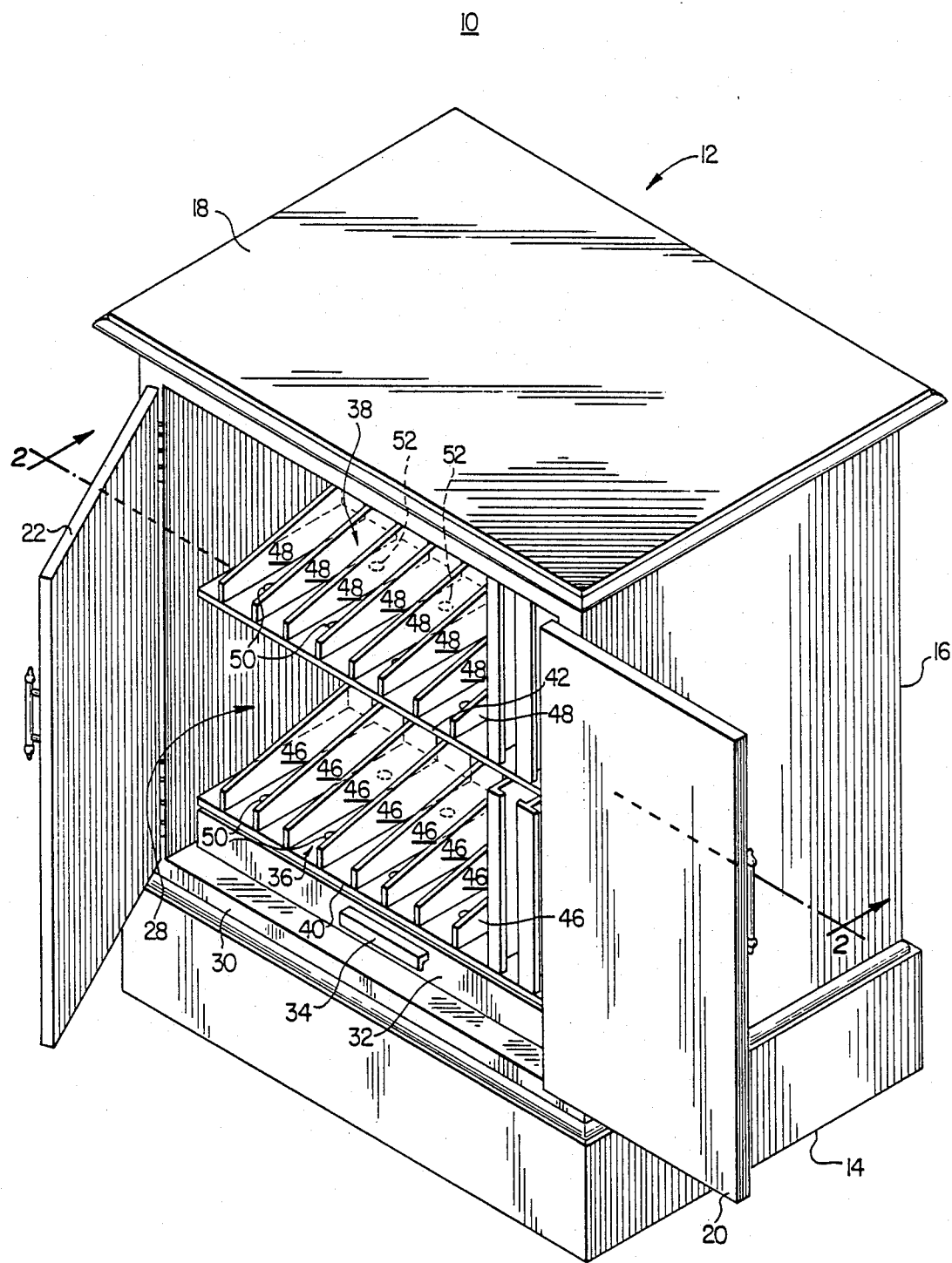
FIG. 1 is an isometric view of the videotape storage cabinet constituting the subject matter of the invention.

The videotape storage cabinet 10 (FIGS. 1 and 2A) constituting the subject matter of the invention includes a housing 12 having a base portion 14, a body portion 16, and a top surface 18. The housing 12 may be of wood, metal, or plastic material to make it compatible with its use environment. The body portion 16 is supported by the base portion 14; it has an open front closable by a pair of doors 20 and 22 connected by hinges to sides of the cabinet. The body portion 16 is divided by a partition 24 (FIG. 3) into a hot sink compartment 26 and a cooler compartment 28. The cooler compartment 28 (FIGS. 1-3) has its side walls, back wall, and top and bottom insulated, for example, by a one inch thick layer of insulating material 30 such as, for example, an expanded synthetic resinous material sold under the trademark Styrofoam. A drawer 32 is slidably mounted in guides adjacent to the bottom of the cooler compartment. A handle 34 is provided for opening and closing the drawer. The drawer is for a drying agent which may be, for example, a diatomaceous earth contained in one or more packages or in bulk for drying the air inside the cooler compartment.

Figure 2B:
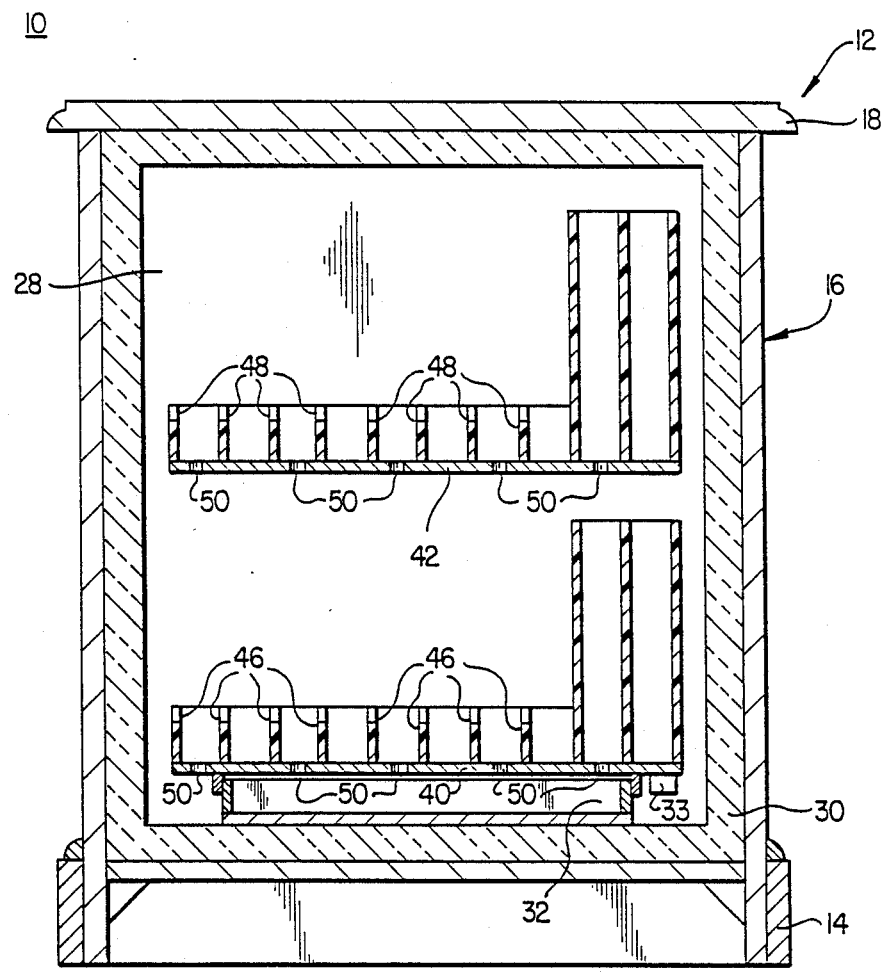
FIGS. 2A and 2B are cross-sectional views of first and second embodiments of the invention taken along line 2—2 of FIG. 1.
Figure 2A:
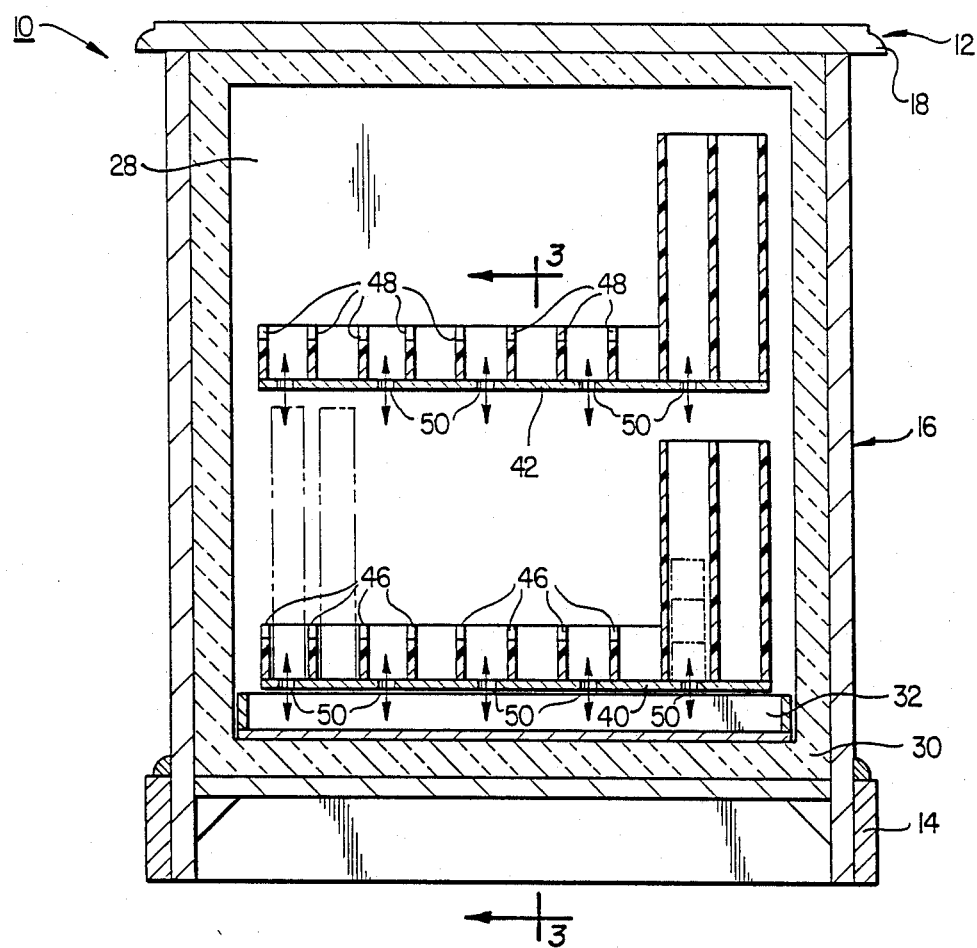
Figure 3:
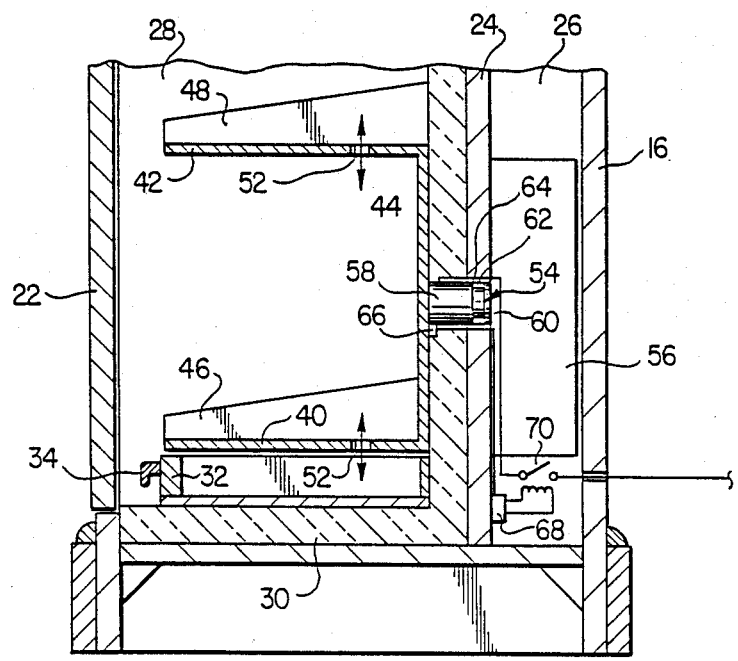
FIG. 3 is a cross-sectional view of the invention taken along line 3—3 of FIG. 2.

A pair of shelves 36 and 38 are formed on arms 40 and 42 of a U-shaped cold sink 44 (FIG. 3). Partitions 46 and 48 (FIGS. 1-3) or trays thereof of a suitable plastic material are epoxyed to the U-shaped cold sink 44. The partitions 46 and 48 of the trays are in contact with the cold sink arms 40 and 42 to provide individual cooling bins for the storage of the videotapes, and if desired the partitions may include film retaining partitions (FIGS. 1 and 2A). It will be appreciated by those skilled in the art that the location of the film bins can be varied without departing from the scope of the invention. Also, the cold sink arms 40 and 42 could be shaped to include the videotape bins.

The cold sink arms 40 and 42 have front and back rows of apertures 50 and 52 for allowing circulation of cold air through the shelf 38 and through the shelf 36 for communication with the drying agent in drawer 32. The arm 40 forms the top for drawer 32. The apertures are alternately spaced in the arms 40 and 42 in order that alternate bins formed by the partitions 46 and 48 have front and back apertures 50 and 52, respectively. Further, the arms 40 and 42 may be spaced from the side walls for improving air circulation about the cooling compartment.

A thermoelectric heat pump 54 (FIG. 3) includes a heat sink 56 in the heat sink compartment 26. Compartment 26 may be vented to draw in air for circulation through the heat sink and to discharge the heated air. The U-shaped cold sink 44 is connected to a conductive block 58 (preferably copper). The thermoelectric heat pump 54 includes a cold plate 64 connected to the conductive block, active elements 62 connected to the cold plate, and a hot plate 60 connected to the active elements at an end opposite to the end attached to the cold plate. The heat sink 56 is attached to the hot plate 60. The length of the copper block is adjusted so that the thermoelectric heat pump and copper block extend to the interior side of the insulation and to the exterior side of the partition 24. A suitable thermoelectric heat pump is a single stage unit sold under the trademark MI 1049 by Marlow Industries, Inc.

To control the temperature of the cooling compartment a temperature sensor 66 is attached to the cold plate 64 of the thermoelectric heat pump. A temperature controller 68 is attached to the partition 24 in the heat sink compartment 26; it is connected to the temperature sensor for sensing the temperature of the cold plate and to a switch 70 in the thermoelectric heat pump power line. The controller 68 includes an adjustable means for setting the control temperature.

In operation videotapes are placed in the appropriate cooling bins. The temperature controller is set at 65 degrees Fahrenheit; thus, when the cold plate temperature is sensed above the set point by the temperature sensor 66, the controller closes the power switch to turn on the thermoelectric heat pump. When the cold plate temperature falls below the set point temperature, the sensor signals the controller to reverse the polarity and the thermoelectric heat pump will provide heating to the plate.

In a second embodiment (FIG. 2B) the drawer with the drying agent can be eliminated or shortened to accommodate a thermoelectric heat pump 33 of a size suitable for maintaining the absolute humidity within a selected range. Another suitable location for the humidity controlling thermoelectric heat pump is on the cold plate of the cooling thermoelectric heat pump. A suitable water drain can be provided if necessary to drain away any moisture dripping from the humidity controlling thermoelectric heat pump. A single or two stage thermoelectric heat pump can be used both to cool and dehumidify the cooling compartment. A suitable single stage thermoelectric heat pump is a MI-1020 thermoelectric heat pump sold by Marlow Industries Inc. A humidity sensor is mounted in the cooling compartment for monitoring the humidity. The humidity sensor is electrically connected to the humidity controlling thermoelectric heat pump for controlling the operation of the heat pump.

For the desiccator embodiment the humidity gage can be viewed to indicate the need for changing or adding more drying agent. It will be appreciated by those skilled in the art that the desired humidity range represents the ideal environment. The upper limit is most critical to prevent moisture formation at the preselected temperature range. The lower limit is not absolute; therefore, no means is provided for adding moisture to the air. Nevertheless, such addition is considered within the capability of one skilled in the art.

Although several embodiments have been described, it will be apparent to a person skilled in the art that various modifications to details of construction shown and described may be made such as, for example, using the cabinet itself as the insulator, without departing from the scope of the invention.

What is claimed is:

1. A storage cabinet for videotapes comprising:
    a housing of ergonomic design having a base portion; an insulated cooling compartment including a removable drying agent drawer for a preselected amount of drying agent, and a shelf means; a heat removal compartment; a pair of doors; and a top surface; the base portion for supporting the insulated cooling compartment above the dirt and dust floor environment, the pair of doors hinged to side walls of the housing and corresponding one to the other to control access to the cooling compartment; and
    a temperature controlled thermoelectric heat pump means for cooling the cooling compartment and having a heat sink mounted in the heat removal compartment, a block of conductive material connected to the cold sink, a thermoelectric element connected to the conductive block, and a heat sink connected to the thermoelectric element, the conductive block having a length sufficient for positioning the cold and heat sinks, respectively, within opposing sides of an insulated wall separating the cooling and heat sink compartments, said cold sink having a heat conductive member for connection to the cold side of the thermoelectric heat pump, and a plurality of spaced heat conductive arms normal to the heat conductive member for forming bottoms for the cooling compartment shelf means; said shelf means including vertical partitions coacting with the cold sink arms to form bins for receiving videotapes for storage, said portions of the cold sink arms forming the bottoms of the shelf bins being apertured for allowing air circulation throughout the cooler and drying agent compartments for cooling and drying the air, whereby the storage cabinet provides a dust free, smoke free, humidity and temperature controlled environment for the stored materials.

2. A storage cabinet according to claim 1 wherein said drying agent comprises diatomaceous earth drying agent supported by said drawer in open communication with the cooling compartment.

3. A storage cabinet according to claim 1 further including a dehumidifying means, said humidifying means being a thermoelectric heat pump mounted in the cooling compartment.

* * * * *